(12) United States Patent
Baldemair et al.

(10) Patent No.: US 11,997,601 B2
(45) Date of Patent: May 28, 2024

(54) WAKEUP SIGNALS (WUS) BASED ON DOWNLINK CONTROL INFORMATION (DCI)

(71) Applicant: Telefonaktiebolaget LM Ericsson (publ), Stockholm (SE)

(72) Inventors: Robert Baldemair, Solna (SE); Ajit Nimbalker, Fremont, CA (US); Sina Maleki, Malmö (SE); Andres Reial, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 462 days.

(21) Appl. No.: 17/285,317

(22) PCT Filed: Nov. 1, 2019

(86) PCT No.: PCT/EP2019/079956
§ 371 (c)(1),
(2) Date: Apr. 14, 2021

(87) PCT Pub. No.: WO2020/089450
PCT Pub. Date: May 7, 2020

(65) Prior Publication Data
US 2022/0240182 A1 Jul. 28, 2022

Related U.S. Application Data

(60) Provisional application No. 62/755,055, filed on Nov. 2, 2018.

(51) Int. Cl.
*H04W 52/02* (2009.01)
*H04L 5/00* (2006.01)

(52) U.S. Cl.
CPC ....... *H04W 52/0229* (2013.01); *H04L 5/0053* (2013.01)

(58) Field of Classification Search
CPC ................. H04W 52/0229; H04L 5/0053
(Continued)

(56) References Cited

U.S. PATENT DOCUMENTS 8,687,568 B2 * 4/2014 Montojo ............... H04L 5/0091
370/348
10,362,570 B2 * 7/2019 Park ....................... H04L 5/0053
(Continued)

FOREIGN PATENT DOCUMENTS

WO 2018175760 A1 9/2018

OTHER PUBLICATIONS

"Triggering Adaptation of UE Power Consumption Characteristics", 3GPP TSG-RAN WG1 Meeting #94bis; R1-1811283; Chengdu, China, Oct. 8-12, 2018, pp. 1-12.
(Continued)

*Primary Examiner* — April G Gonzales
(74) *Attorney, Agent, or Firm* — Murphy, Bilak & Homiller, PLLC

(57) ABSTRACT

Exemplary embodiments include methods for a user equipment (UE) to receive a wake-up signal (WUS) via downlink control information (DCI) transmitted by a network node in a radio access network (RAN). Such methods include receiving a physical downlink control channel (PDCCH) from the network node, and processing the received PDCCH to determine if it includes a DCI carrying a WUS targeted to the UE. The processing can include determining if a payload portion of the DCI is based on a first function of an identifier associated with the UE (e.g., C-RNTI) or with a group of UEs (e.g., WUG-RNTI). The processing can also include determining if a cyclic redundancy check (CRC) portion of the DCI is based on a second function of the identifier. Other embodiments include complementary methods performed
(Continued)

by a network node, and UEs or network nodes configured to perform the exemplary methods.

19 Claims, 11 Drawing Sheets

(58) Field of Classification Search
USPC .......................................................... 455/574
See application file for complete search history.

(56) References Cited

U.S. PATENT DOCUMENTS

| | | | |
|---|---|---|---|
| 11,757,498 B2* | 9/2023 | Baldemair | H04L 1/1812 |
| | | | 370/329 |
| 2005/0152404 A1* | 7/2005 | Holmquist | H04L 1/0025 |
| | | | 370/485 |
| 2009/0232309 A1* | 9/2009 | Montojo | H04L 5/0091 |
| | | | 380/287 |
| 2018/0279274 A1* | 9/2018 | Sun | H04W 52/367 |
| 2022/0366090 A1* | 11/2022 | Hustava | G06F 21/606 |
| 2023/0276362 A1* | 8/2023 | Reial | H04W 56/0015 |
| | | | 370/311 |

OTHER PUBLICATIONS

"3GPP TS 36.213 V15.2.0", 3rd Generation Partnership Project; Technical Specification Group Radio Access Network; Evolved Universal Terrestrial Radio Access (E-UTRA); Physical layer procedures (Release 15), Jun. 2018, pp. 1-541.

* cited by examiner

WAKEUP SIGNALS (WUS) BASED ON DOWNLINK CONTROL INFORMATION (DCI)

TECHNICAL FIELD OF THE DISCLOSURE

The present invention generally relates to wireless communication networks, and particularly relates to improvements in wireless device power consumption by use of wakeup signals (WUS).

BACKGROUND INFORMATION

Long Term Evolution (LTE) is an umbrella term for so-called fourth generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X1 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI, e.g., scheduling information) needed for correct reception of PDSCH, as well as for uplink (UL) scheduling grants that facilitate transmission on PUSCH.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI), including HARQ acknowledgements, channel state information (CSI) reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

An exemplary LTE FDD uplink (UL) radio frame can be configured in a similar manner as the exemplary FDD DL radio frame shown in FIG. 3. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to transmission resources, such as the exemplary DL resource structure illustrated by FIG. 3. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

LTE DL transmissions are dynamically scheduled, such that in each subframe the network transmits DCI (e.g., on PDCCH) indicating, for the current DL subframe, to which the terminal(s) data will be transmitted (e.g., on PDSCH) and in which RBs the data will be transmitted. This control signaling is typically transmitted in the first n OFDM symbols in each subframe and the number n (n=1, 2, 3, or 4) is known as the Control Format Indicator (CFI) indicated by the PCFICH transmitted in the first symbol of the control region.

The LTE RRC layer (shown in FIGS. 2B-C) controls communications between a UE and an eNB at the radio interface, as well as the mobility of a UE between cells in the E-UTRAN. There are two RRC states defined for an LTE UE. More specifically, after the UE is powered ON it will be in the RRC_IDLE state until the RRC connection is established, at which time it will transition to RRC_CONNECTED state where data transfer can occur. After a connection is released, the UE returns to RRC_IDLE. In RRC_IDLE state, the UE's radio is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

To support mobility (e.g., handover or reselection) between cells and/or beams, a UE can perform periodic cell search and measurements of signal power and quality (e.g., reference signal received power, RSRP, and reference signal received quality, RSRQ) in both RRC_CONNECTED and RRC_IDLE modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN RS, UE-specific demodulation RS (DM-RS) associated with PDSCH, DM-RS associated with EPDCCH or M/NPDCCH, positioning RS (PRS), and channel state information RS (CSI-RS).

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC service requires a low latency and high reliability transmission but perhaps for moderate data rates.

In RRC_CONNECTED mode, a UE monitors PDCCH for scheduled PDSCH/PUSCH and for other purposes. It is known that for LTE, depending on a UE's discontinuous reception (DRX) configuration, the UE may spend a substantial part of its energy on decoding PDCCH without detecting a PDSCH/PUSCH scheduled for it. The situation can be similar in NR if similar DRX settings with traffic modelling are utilized, since the UE will still need to perform blind detection in its configured search spaces to identify whether there is a PDCCH targeted to it.

Techniques that can reduce unnecessary PDCCH monitoring or allowing UE to go to sleep or wake-up only when required can be beneficial. One such technique is to send Wakeup Signal (WUS) that a UE can detect by expending much less energy as compared to PDCCH detection. When a UE detects a WUS targeted to it, the UE will wake up and activate the conventional PDCCH decoder. However, there is a need for a better balance between missed WUS detection (resulting in a missed PDCCH) and WUS false detections, which cause the UE to consume energy by unnecessary activation of the PDCCH decoder.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures for receiving a wake-up signal (WUS) via downlink control information (DCI) transmitted by a network node in a radio access network (RAN). These exemplary methods and/or procedures can be performed by a user equipment (UE, e.g., wireless device, IoT device, modem, etc. or component(s) thereof).

These exemplary methods and/or procedures can include receiving a PDCCH from the network node, and processing the received PDCCH to determine if it includes a DCI carrying a WUS targeted to the UE. The processing operations can include determining if a payload portion of the DCI is based on a first function of an identifier associated with the UE or with a group of UEs that includes the UE. The processing operations can also include determining if a cyclic redundancy check (CRC) portion of the DCI is based on a second function of the identifier. In some embodiments, these exemplary methods and/or procedures can also include various additional operations based on determining that the payload portion of the DCI contains a WUS targeted to the UE. Furthermore, various embodiments utilize various identifiers, various first functions, and/or various second functions.

In some embodiments, the identifier can be one of a cell radio network temporary identifier (C-RNTI) or a wake-up group RNTI (WUG-RNTI). In some embodiments, the first function can include truncation of the identifier to a smaller number of bits, or repetition of at least a portion of the identifier. In some embodiments, the second function can include scrambling the CRC based on the identifier. In such embodiments, the processing operations can include descrambling the CRC portion based on the identifier.

In various embodiments, determining if the payload portion is based on the first function of the identifier can include various operations. In some embodiments, these operations can include determining whether the payload portion includes the first function of the identifier. In some embodiments, this operation can include determining whether the payload portion comprises the first function of the identifier concatenated with a valid command for the UE.

In other embodiments, determining if the payload portion is based on the first function can include descrambling the payload portion based on the first function, and detecting whether the descrambled payload portion includes a valid command for the UE. In some embodiments, the descrambling can be performed using an exclusive OR (XOR). In some embodiments, detecting whether the descrambled payload portion includes a valid command comprises detecting whether the descrambled payload portion includes a valid command concatenated with one or more padding bits.

In other embodiments, detecting whether the descrambled payload portion includes a valid command can include detecting whether the descrambled payload portion comprises one of a plurality of valid sequences, with each sequence corresponding to a different valid command. In some of these embodiments, the exemplary method and/or procedure can also include receiving, from the network node, an identifier associated with the plurality of sequences. For example, the identifier can identify a valid subset of all available sequences, such that the UE attempts to detect only the valid sequences as identified.

In some embodiments, the processing operations can include descrambling at least one of the following using an initialization value based on the identifier: coded bits in the received PDCCH, and at least one reference signal in the received PDCCH. For example, the coded bits in the PDCCH can include the DCI carrying the WUS targeted for the UE. Such descrambling can be performed, for example, if the PDCCH has been scrambled before transmission.

Other exemplary embodiments of the present disclosure include methods and/or procedures for transmitting a wake-up signal (WUS) to at least one user equipment (UE) via downlink control information (DCI). These exemplary methods and/or procedures can be performed by a network node (e.g., base station, eNB, gNB, relay, etc. or components thereof) in a radio access network (RAN, e.g., E-UTRAN, NG-RAN, etc.).

These exemplary methods and/or procedures can include, based on an identifier associated with the UE or with a group of UEs that includes the UE, determining DCI that includes a WUS for the UE. These operations may determine a payload portion of the DCI based on a first function of the identifier and determining a cyclic redundancy check (CRC) portion of the DCI based on a second function of the identifier. These exemplary methods and/or procedures can also include transmitting the DCI via a PDCCH. Various embodiments utilize various identifiers, various first functions, and/or various second functions In some embodiments, the identifier can be one of a cell radio network temporary identifier (C-RNTI) or a wake-up group RNTI (WUG-RNTI). In some embodiments, the first function can include truncation of the identifier to a smaller number of bits, or repetition of at least a portion of the identifier. In some embodiments, the second function can include scrambling based on the identifier (e.g., via XOR).

In some embodiments, these exemplary methods and/or procedures can also include scrambling at least one of the following using an initialization value based on the identifier: coded bits to be transmitted in the PDCCH; and at least one reference signal to be transmitted in the PDCCH. For example, the coded bits can include the DCI after undergoing channel coding. In some embodiments, these exemplary methods and/or procedures can also include transmitting, to the UE via the PDCCH, further DCI including a schedule for a subsequent transmission to or from the UE on a shared channel (e.g., PDSCH or PUSCH). In some embodiments, the DCI is transmitted at a first time, the further DCI is transmitted at a second time (i.e., later than the first time), and the difference between the first time and the second time is greater than a PDCCH decoder activation time associated with the UE.

In various embodiments, determining the payload portion based on the first function of the identifier can include various operations. In some embodiments, these operations can include inserting the first function of the identifier into the payload portion. In some embodiments, these operations can include inserting a command for the UE into the payload portion. In some embodiments, these operations can include scrambling the command by the first function before inserting the command into the payload portion. In some embodiments, these operations can include concatenating the command with one or more padding bits before the scrambling.

In some embodiments, the command can be represented by one of a plurality of valid sequences, with each sequence corresponding to a different valid command. In such embodiments, these exemplary methods and/or procedures can include transmitting, to the UE, an identifier associated with the plurality of valid sequences. For example, the identifier can identify a valid subset of all available sequences.

In some embodiments, determining the payload portion based on the first function of the identifier can include concatenating the command with the first function of the identifier, and inserting the concatenated command and first function of the identifier into the payload portion.

Other exemplary embodiments include network nodes (e.g., base stations, eNBs, gNBs, relays, etc. or components thereof) or user equipment (UEs, e.g., wireless devices, IoT devices, etc. or components thereof) configured to perform operations corresponding to any of the exemplary methods and/or procedures described herein. Other exemplary embodiments include non-transitory, computer-readable media storing program instructions that, when executed by processing circuitry, configure such network nodes or UEs to perform operations corresponding to any of the exemplary methods and/or procedures described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 6, which includes

or component thereof), according to various exemplary embodiments of the present disclosure.

Figure 11:
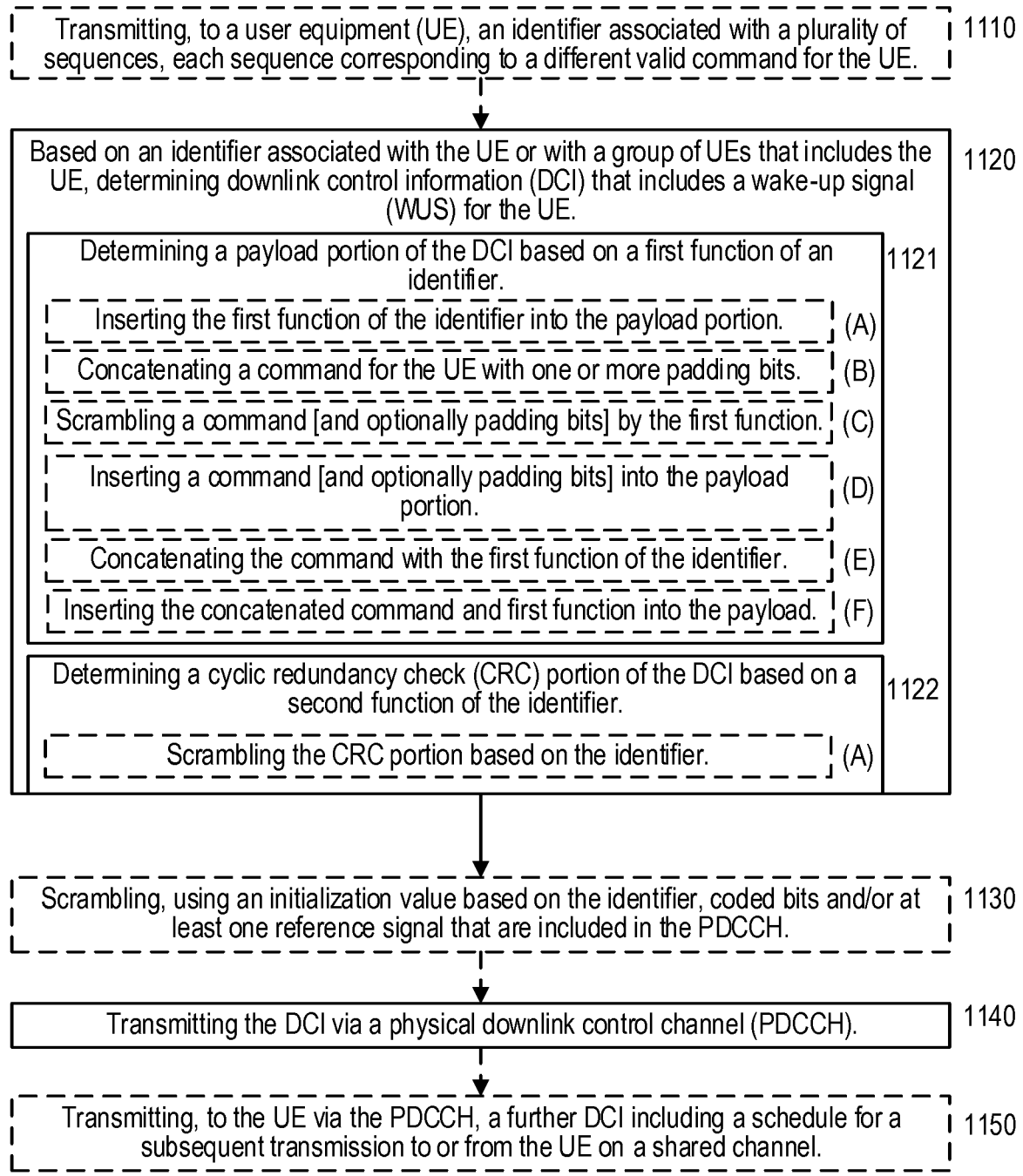

FIG. 11 shows a flow diagram of an exemplary method and/or procedure performed by a network node (e.g., base station, gNB, eNB, MME, AMF, SMF, relay, etc. or component thereof) in a radio access network (RAN), according to various exemplary embodiments of the present disclosure.

Figure 12:
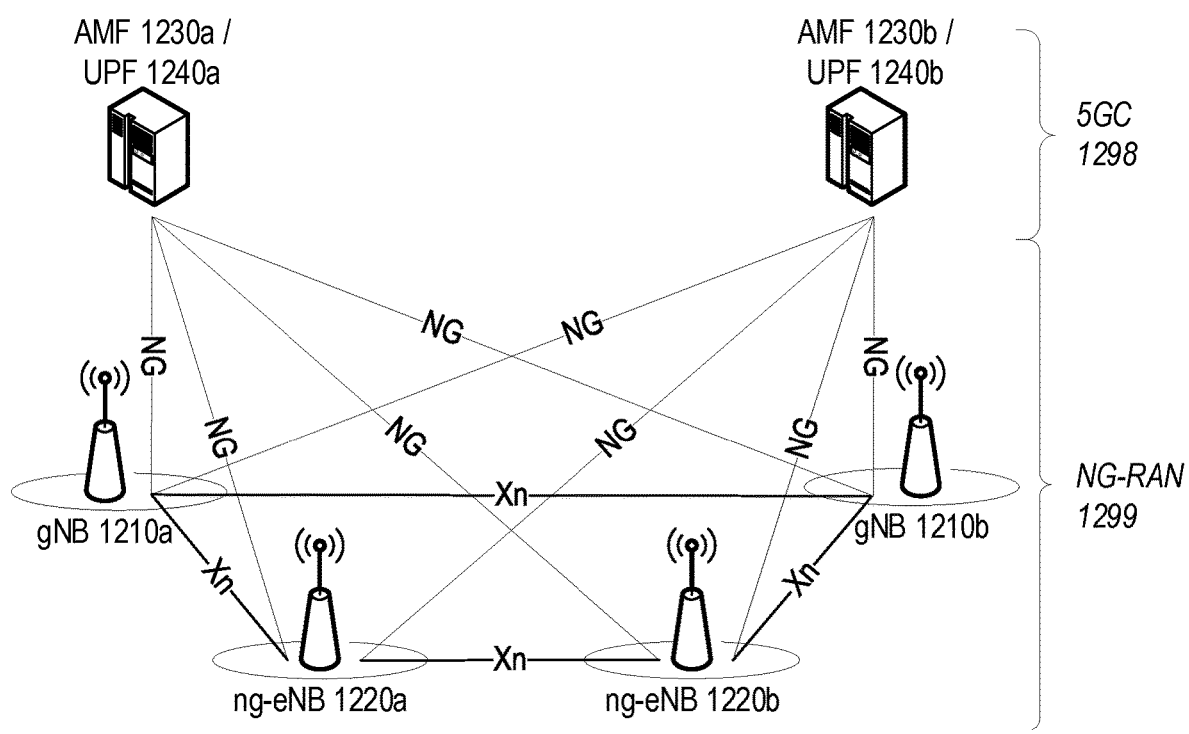

FIG. 12 shows a high-level view of an exemplary 5G network architecture, according to various exemplary embodiments of the present disclosure.

Figure 13:
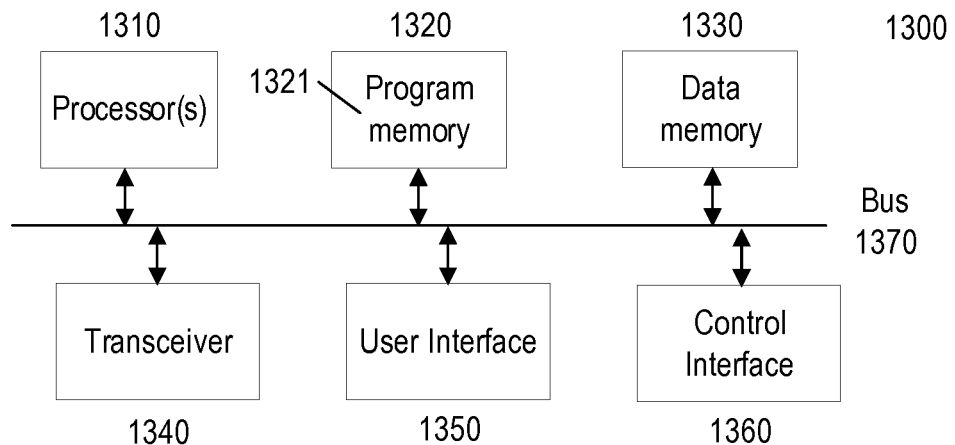

FIG. 13 is a block diagram of an exemplary wireless device or UE, according to various exemplary embodiments of the present disclosure.

Figure 14:
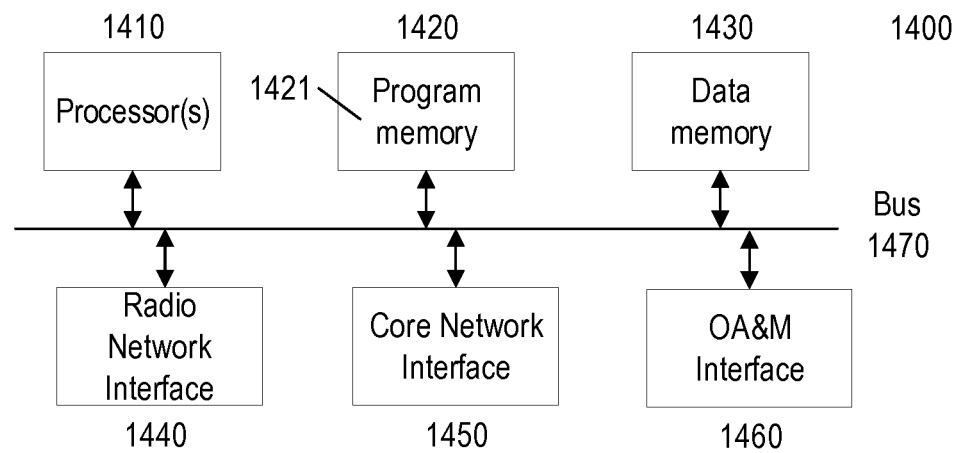

FIG. 14 is a block diagram of an exemplary network node, according to various exemplary embodiments of the present disclosure.

Figure 15:
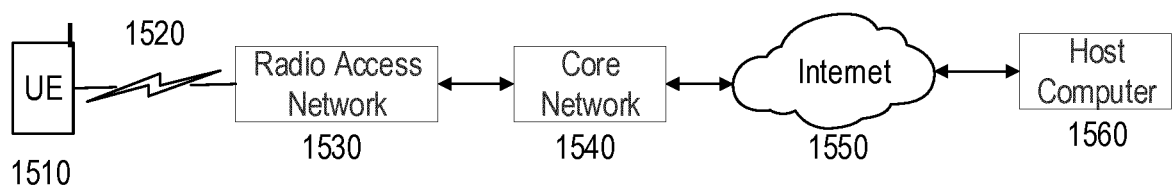

FIG. 15 is a block diagram of an exemplary network configured to provide over-the-top (OTT) data services between a host computer and a UE, according to various exemplary embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or alternately "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, there remains a need for a better balance between missed WUS detection (resulting in a missed PDCCH) and WUS false detections, which cause the UE to consume energy through unnecessary activation of the PDCCH decoder. This is discussed in more detail below.

Similar to LTE, NR uses OFDM in the downlink. Each NR radio frame is 10 ms in duration and is composed of 10 subframes having equal durations of 1 ms each. Each subframe consists of one or more slots, and each slot consists of 14 (for normal cyclic prefix) or 12 (for extended cyclic prefix) time-domain symbols. The NR PHY allows mini-slot transmissions, which can include from one symbol up to one less than the number of symbols in a slot (e.g., 14 or 12), and can start at any symbol within a slot. Furthermore, an NR slot can also be arranged with various combinations of UL and DL symbols.

Also similar to LTE, an NR resource block (RB) includes 12 contiguous (or consecutive) subcarriers in the frequency domain. In some cases, a RB can span the duration of a 14-symbol slot in the time domain, but in other examples may span a different number of symbols. Common RBs (CRBs) are numbered from 0 to the end of the system bandwidth.

In Rel-15 NR, a UE can be configured with up to four DL carrier bandwidth parts (BWPs) with a single DL BWP being active at a given time. A UE can be configured with up to four UL BWPs with a single UL BWP being active at a given time. If a UE is configured with a supplementary UL, the UE can also be configured with up to four supplementary UL BWPs with a single supplementary UL BWP being active at a given time.

Each BWP configured for a UE has a common reference of CRB 0, such that a particular configured BWP may start at a CRB greater than zero. In this manner, a UE can be configured with a narrow BWP (e.g., 12 MHz) and a wide BWP (e.g., 120 MHz), each starting at a particular CRB, but only one BWP can be active for the UE at a given time.

Within a BWP, RBs are defined and numbered in the frequency domain from 0 to $N_{BWPi}^{size}-1$, where i is the index of the particular carrier BWP. Similar to LTE, each NR RE corresponds to one OFDM subcarrier during one OFDM symbol interval. Various subcarrier spacing (SCS) values (referred to as numerologies) are supported in NR and are given by $\Delta f=(15\times 2^\mu)$ kHz where $\mu \in (0,1,2,3,4)$ denotes the numerology value. $\Delta f=15$ kHz is the basic (or reference)

subcarrier spacing that is also used in LTE. The slot length is inversely related to subcarrier spacing or numerology according to $½^\mu$ ms. For example, there is one (1-ms) slot per subframe for $\Delta f=15$ kHz ($\mu=0$), two 0.5-ms slots per subframe for $\Delta f=30$ kHz ($\mu=1$), etc. In addition, the RB bandwidth is directly related to numerology according to $2^\mu*180$ kHz.

Table 1 below summarizes the supported NR transmission numerologies $\mu$ and associated parameters. A UE's DL and UL numerologies can be configured independently by the network, subject to UE support.

TABLE 1

| $\mu$ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.112 |
| 3 | 120 | Normal | 145 µs | 1.44 |
| 4 | 240 | Normal | 62.5 µs | 2.88 |

Also similar to LTE, NR DL transmissions are dynamically scheduled, whereby in each slot the gNB transmits downlink control information (DCI) about which UE data is to be transmitted and the RBs in the current DL slot used to carry the data. For example, DCI formats 1_0 and 1_1 are used to convey DL grants for transmission on PDSCH. DCI is typically transmitted in the first one to three OFDM symbols in each NR slot on the PDCCH, with data carried on the PDSCH. A UE first detects and decodes PDCCH and, if successful, then decodes the corresponding PDSCH based on the DCI received via the PDCCH. Likewise, UL data transmissions are dynamically scheduled on the PUSCH via DCI transmitted on the PDCCH. DCI formats 0_0 and 0_1 are used to convey UL grants to the UE for transmission on PUSCH, while DCI formats 1_0 and 1_1 are used to convey DL grants for transmission on PDSCH. Other DCI formats (2_0, 2_1, 2_2 and 2_3) are used for other purposes including transmission of slot format information, reserved resource, transmit power control information, etc.

Referring back to the earlier discussion about physical channels, in general, a UE determines its RB assignment in frequency domain for PUSCH or PDSCH using the resource allocation field in a DCI targeted to the UE on PDCCH. For PUSCH carrying msg3 in a random-access procedure, the frequency domain resource assignment (FDRA) is signaled by using the UL grant contained in RAR. In NR, two frequency resource allocation schemes, type 0 and type 1, are supported for PUSCH and PDSCH. The type to use for a PUSCH/PDSCH transmission can be defined by an RRC-configured parameter or indicated directly in the corresponding DCI or UL grant in RAR (for which type 1 is used).

A DCI includes a payload complemented with a Cyclic Redundancy Check (CRC) of the payload data. Since all DCIs carried on PDCCH are received by all terminals listening to the PDCCH, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

The payload together with the identifier-scrambled CRC is encoded and transmitted on the PDCCH. Each UE tries to detect a PDCCH with multiple hypothesis with respect to payload size and location in the time-frequency grid based on its configured search spaces. Once a UE decodes a DCI it de-scrambles the CRC with RNTI(s) that is(are) assigned to it and/or associated with the particular PDCCH search space. In case of a match, the UE considers the detected DCI addressed to itself and follows the instructions (e.g., scheduling information) contained in the DCI.

A PDCCH candidate is searched within a common or UE-specific search space that is mapped to a set of time and frequency resources referred to as a control resource set (CORESET). The search spaces within which PDCCH candidates must be monitored are configured to the UE via RRC signaling. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining CORESETs is a Resource Element Group (REG), which spans one PRB in frequency and one OFDM symbol in time. Each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET can be indicated to the UE. The UE can assume that any precoder used for the transmission of the PDCCH is the same for all the REGs in the REG bundle. A REG bundle may consist of 2, 3, or 6 REGs.

A control channel element (CCE) consists of six (6) REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used. Interleaving can provide frequency diversity. Not using interleaving is beneficial for cases where knowledge of the channel allows the use of a precoder in a particular part of the spectrum to improve the SNR at the receiver.

A hashing function can be used to determine the CCEs corresponding to PDCCH candidates that a UE must monitor within a search space set. The hashing is done differently for different UEs so that the CCEs monitored by UEs are randomized. This technique reduces the probability of collisions between multiple UEs monitoring PDCCH candidates in the same CORESET.

A PDCCH candidate may span 1, 2, 4, 8, or 16 aggregated CCEs, with the number of aggregated CCEs referred to as the aggregation level (AL). If more than one CCE is aggregated, the encoded PDCCH payload is spread across multiple CCEs. By varying the aggregation level, PDCCH can be made more or less robust for a certain payload size. In other words, PDCCH link adaptation can be performed by adjusting the aggregation level.

A Wakeup-DCI (WU-DCI) is a DCI transmission on a regular PDCCH that does not schedule PDSCH/PUSCH data or carry conventional DL control signaling. The CRC may be scrambled with the C-RNTI of the targeted UE or a WUG-RNTI (wakeup group RNTI) with which the UE has been configured. For example, when a UE is configured with a WUG-RNTI it belongs to this specific WU-group and can be awakened by a DCI addressed to this WUG-RNTI. A UE can also be configured to monitor WUS with either C-RNTI or WUG-RNTI. Note that a WU-group is not limited to any specific number of UEs, and can be as small (e.g., a single UE) or as large as practical for any specific application, taking into account rates of missed and false WUS detections, as well as other considerations discussed herein.

In general, a WU-DCI can carry dummy data and a targeted UE receives the WU message by a successful CRC check using its C-RNTI or an assigned WUG-RNTI. Alternatively, the WU-DCI may also carry additional information to the targeted UE, or a UE group, to instruct the UE to perform some subsequent action. The search space for WU-DCI may be common or UE-specific. To reduce UE blind decoding attempts and resulting energy, the search space(s) where WUS-DCI can be transmitted are typically very limited so that UE only has to test for one, or a small number of, RE hypothesis(es).

However, if the same dummy data are used as payload for multiple WU-DCI such that the respectively targeted UEs are only differentiated based on the scrambled CRC bits, a large portion of the information bits prior encoding are the same. Since commands are generally relatively small compared to payload size, the same will be true if the payload consists of a small command followed by a larger common padding sequence. In other words, the distance between two WUS information bit sequences prior encoding is relatively small since it is based only on the differently scrambled CRC bits. As such, the various targeted UEs monitoring for WU-DCI have difficulty in distinguishing which message targets which UE, which can lead to a significant increase in false detection and resulting UE energy consumption.

Accordingly, exemplary embodiments of the present disclosure provide novel techniques to adapt the payload of a WU-DCI message to a targeted UE. For example, the payload can depend on and/or be configured according to an RNTI associated with and/or assigned to the UE, such as a C-RNTI, WUG-RNTI, etc. Each resulting WUS configured in this manner can have a relatively large Hamming or Euclidean distance(s) from nearby neighbors in the WUS space, resulting in lower false-alarm rates without increasing the missed-detection rate. In other words, since the Kullback-Leibler divergence (i.e., the distance between the distribution of different WUS hypotheses) also increases, a larger detection threshold can be used, thereby reducing the false-alarm rate and while maintaining the same missed detection rate. This lower false-alarm rate results in fewer unnecessary wakeups for PDCCH monitoring and, consequently, lower UE energy consumption.

Figure 4:
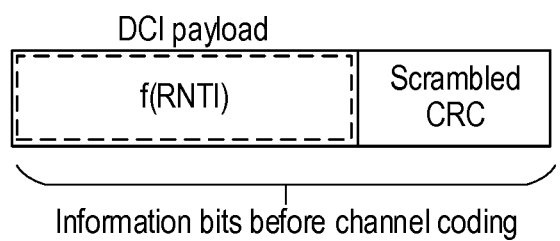
FIG. 4 shows information bits of an exemplary wake-up signal downlink control information (WUS-DCI) whose payload includes a function of a radio network temporary identifier, f(RNTI), according to various exemplary embodiments of the present disclosure.

In some embodiments, a WUS-DCI payload can be based on (e.g., a function of) the same the same RNTI (e.g., C-RNTI or WUG-RNTI) used to scramble the CRC of the DCI. FIG. 4 shows information bits (e.g., prior to channel encoding) of an exemplary WUS-DCI where the payload is a function of an RNTI (expressed as f(RNTI)), according to these embodiments. For example, the payload space can contain multiple repetitions of the RNTI, or portions thereof. Using less than the entire RNTI can be possible if a network has fewer users in RRC_CONNECTED state than the number of available C-RNTIs. In such case, the network can systematically assign C-RNTIs such that only a subset of C-RNTI bits are variable while the remaining bits of C-RNTI are fixed. The variable C-RNTI bits can constitute the portion repeated in the WUS-DCI payload.

Rather than a direct insertion function, discussed above, other exemplary functions, f(RNTI), can generate bits for insertion that are different from the RNTI bits. One exemplary function is an exclusive-OR (XOR) between the RNTI (or parts thereof) and another sequence. This other sequence can also be configured, specified in the standard, derived from a parameter known to the UE (e.g., physical cell ID), etc.

Figure 5:
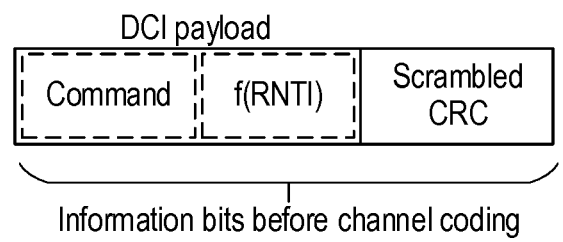
FIG. 5 shows information bits of an exemplary WUS-DCI whose payload includes a command in addition to f(RNTI), according to exemplary embodiments of the present disclosure.

In other embodiments, the WUS-DCI payload can also include one or more commands in addition to the WUS. In such case, the portion of the WUS-DCI payload not used for the one or more commands can based on (e.g., a function of) the same RNTI (e.g., C-RNTI or WUG-RNTI) used to scramble the CRC of the DCI, similar to other embodiments described above. FIG. 5 shows information bits (e.g., prior to channel coding) of an exemplary WUS-DCI whose payload includes a command in addition to f(RNTI), according to exemplary embodiments of the present disclosure.

Alternately, the command portion can also be scrambled with the same RNTI (or a portion thereof) used to scramble the CRC, or a function f(RNTI) of that RNTI. Scrambling can be performed by an XOR operation. Exemplary commands can include conventional DCI commands (e.g., scheduling) and/or commands related to wake-up procedures. For example, a command could indicate to the UE when (e.g., delay) and/or where (e.g., in which PDCCH search space) to expect a scheduling DCI. In this case, the delay should be larger than the time needed for the UE to wake up and activate the regular PDCCH decoder. Other command parameters can also be included in the command bit sequence portion.

In some of these embodiments, the command may be repeated and/or padded according to the DCI payload size. In cases where the command is repeated, the size of the padding field may be very small, even zero. The function of the RNTI can also be selected according to the DCI payload size. For example, f(RNTI) can include truncation of the RNTI or repetition of the RNTI (or of a portion thereof).

Figure 6A:
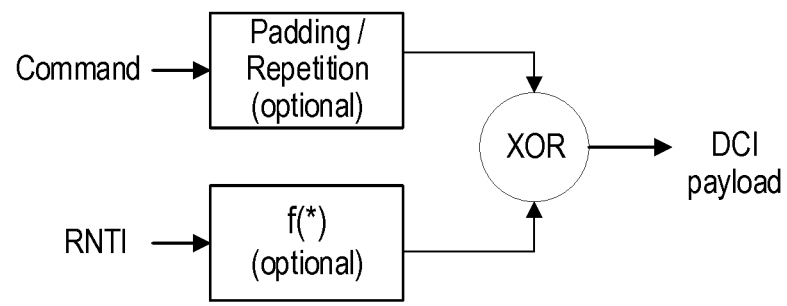
FIGS. 6A-6C, illustrates various techniques for constructing a WUS-DCI based on a command, f(RNTI), and an exclusive-OR (XOR) operation, according to various exemplary embodiments of the present disclosure.
Figure 6B:
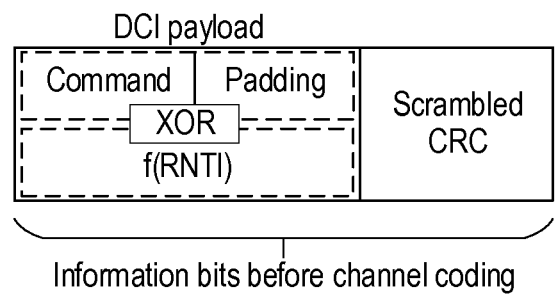
Figure 6C:
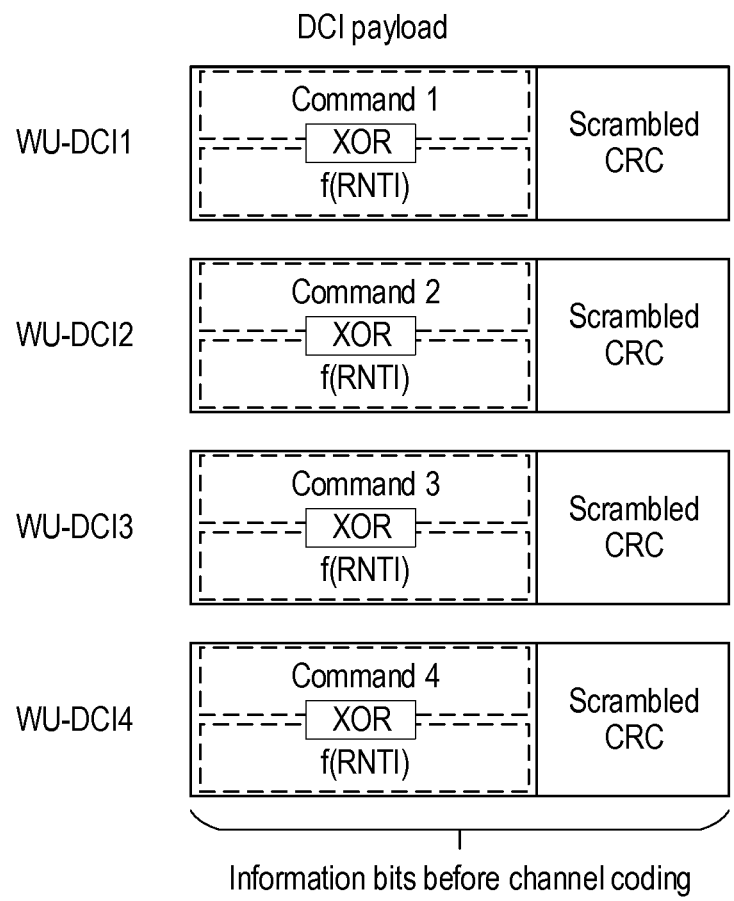

FIG. 6, which includes FIGS. 6A-6C, illustrates various techniques for constructing a WUS-DCI based on a command, f(RNTI), and an exclusive-OR (XOR) operation, according to various exemplary embodiments of the present disclosure. More specifically, FIG. 6A illustrates a general technique for determining the DCI payload (e.g., prior to channel encoding) according to these embodiments. The technique illustrated by FIG. 6A can be performed by various combinations of hardware (e.g., processing circuitry) and software (e.g., instructions).

FIG. 6B shows an exemplary WUS-DCI determined according to an exemplary embodiment of the technique illustrated in FIG. 6A. In FIG. 6B, a command (e.g., two bits) is padded according to a DCI payload size (e.g., four bits), with the padded command being scrambled by f(RNTI). Note that both the relative order and the relative sizes of the command and padding fields are merely exemplary.

FIG. 6C shows four different exemplary WU-DCI messages, each based on a different included command. A two-bit command sequence (or identifier) can be used to distinguish between the four commands. This example involves a two-bit DCI payload size such that no command padding is required. The two-bit command sequence is then scrambled with f(RNTI) selected according to the two-bit DCI payload. As another example, if the DCI payload size is four bits, a four-bit command sequence (or identifier) can be used to distinguish between up to sixteen (16) commands. The four-bit command sequence is then scrambled with f(RNTI) selected according to the four-bit DCI payload.

Although the above embodiments are described in terms of the WUS-DCI payload being based on, or derived from, an RNTI, the WUS-DCI payload could also be derived from another configured parameter, or a parameter known to the UE.

In various embodiments, a set of sequences available for use can be selected to have good minimum distances (e.g., Hamming distances) from each other in the relevant space. In some embodiments, the set of sequences can be selected based on the Euclidean distance between the PDCCH signals resulting from the respective sequences, or other relevant metric(s) that can be used to characterize separation of signals within a space. The set of sequences could also be selected based other design criteria, e.g., ability to detect multiple sequences with same hardware and/or limited additional energy consumption. This set of sequences can be specified, e.g., in a 3GPP TS. The network can then configure a particular UE with one (or a subset) of the available sequences, such that the UE attempts to detect the configured sequence(s).

In embodiments where the UE is assigned a set of sequences with each sequence associated with a different message and/or command, the separation between sequences in the assigned set can be particularly important, since incorrect message/command detection can be more detrimental than a false alarm due to a WUS for a different UE. As such, in various embodiments, the total set of sequences available for use by the network can be selected to a plurality of subsets assignable to individual UEs, with the distance between members of individual subsets (e.g., used for different messages) being maximized, optimized, and/or increased.

The selection of sequence subsets in this manner can be based on one or more properties and/or separation metrics exceeding a quality threshold. In some embodiments, to ensure largest possible inter-message distance for sequences targeting the same UE, under the constraint that the CRC scrambling should follow the existing PDCCH framework, the payload contents may be determined according to any of the above embodiments, and additional message-dependent scrambling may be applied to these baseline payload contents to increase the coded sequence separation by virtue of making the uncoded sequences as different as possible.

As mentioned above, one of the main goals of WUS-DCI is to reduce UE power consumption, e.g., through lower UE receiver energy consumption. In some embodiments, the UE can be configured with a specific WUS CORESET having a small search space and narrow bandwidth compared to a wider bandwidth needed for data transfer (e.g., a wider BWP for PDSCH reception or PUSCH transmission). The small search space can reduce the number of blind decodings required. The lower bandwidth also reduces receiver power consumption through a general proportionality relation between these two parameters. Even so, the time needed to switch the UE receiver from the lower WUS-DCI bandwidth to a higher bandwidth of a PDCCH scheduling DCI should be smaller than the delay (e.g., number of symbols) between these two DCIs. This minimum wake-up delay can be specified, e.g., in a 3GPP TS. In some embodiments, one of the payload commands in the WUS-DCI can be used to specify the time that the UE can expect a scheduling PDCCH DCI having a higher bandwidth. The delay between these two DCIs should be greater than or equal to the minimum wake-up delay.

In some embodiments, the network can configure the UE with a particular numerology (e.g., carrier frequency, bandwidth, subcarrier spacing, etc.) that is optimized for reducing and/or minimizing WUS-DCI detection power consumption subject to the minimum wake-up delay. Nevertheless, in case this numerology is different from the numerology used by the UE receiver for other PDCCH/PDSCH reception, the time needed to change the numerology should be the same as minimum delay for waking up the receiver for regular PDCCH monitoring.

Furthermore, a "narrow" bandwidth is relative to what is used by another transmission (e.g. PDSCH) and does not necessary mean if N resource elements are required for WUS-DCI, these must be distributed in time to keep the bandwidth as low as possible. Indeed, in most cases, it may be better to distribute the resource elements in frequency to shorten the WUS time while having comparable or even less energy consumption.

As mentioned above, missed-detection and false-alarm (or false-detection) rates are important factors in selecting sequences for WUS-DCI. Missed detection of WUS-DCI leads to larger reception delay, missed PDCCH/PDSCH/PUSCH transmissions, and a larger signaling overhead for the network. Therefore, it is necessary to keep the miss detection rate as low as possible. On the other hand, false alarms lead to unnecessary wake-up of the UE, which results in higher UE energy consumption. Although missed-detection and false-alarm rates of zero would be ideal, in practice this is impossible and there is always a trade-off between the two parameters. The values of these parameters in a UE implementation can depend on the particular detector used and quality of the WUS-DCI signal received via the radio channel, as measured by link performance metrics such as signal to noise ratio (SNR). As such, it is preferable to specify and/or define (e.g., in a 3GPP TS) UE performance requirements for missed-detection and/or false-alarm rates.

In some embodiments, the network can select sequences for WUS-DCI based on UE capabilities and link performance metrics such that the specified performance requirements for missed-detection and false-alarm rate can be satisfied. In case the WUS-DCI addresses a group of UEs instead of a specific UE, then the network can select the WUS-DCI sequences based on for the worst-case UE of the group.

Figure 7:
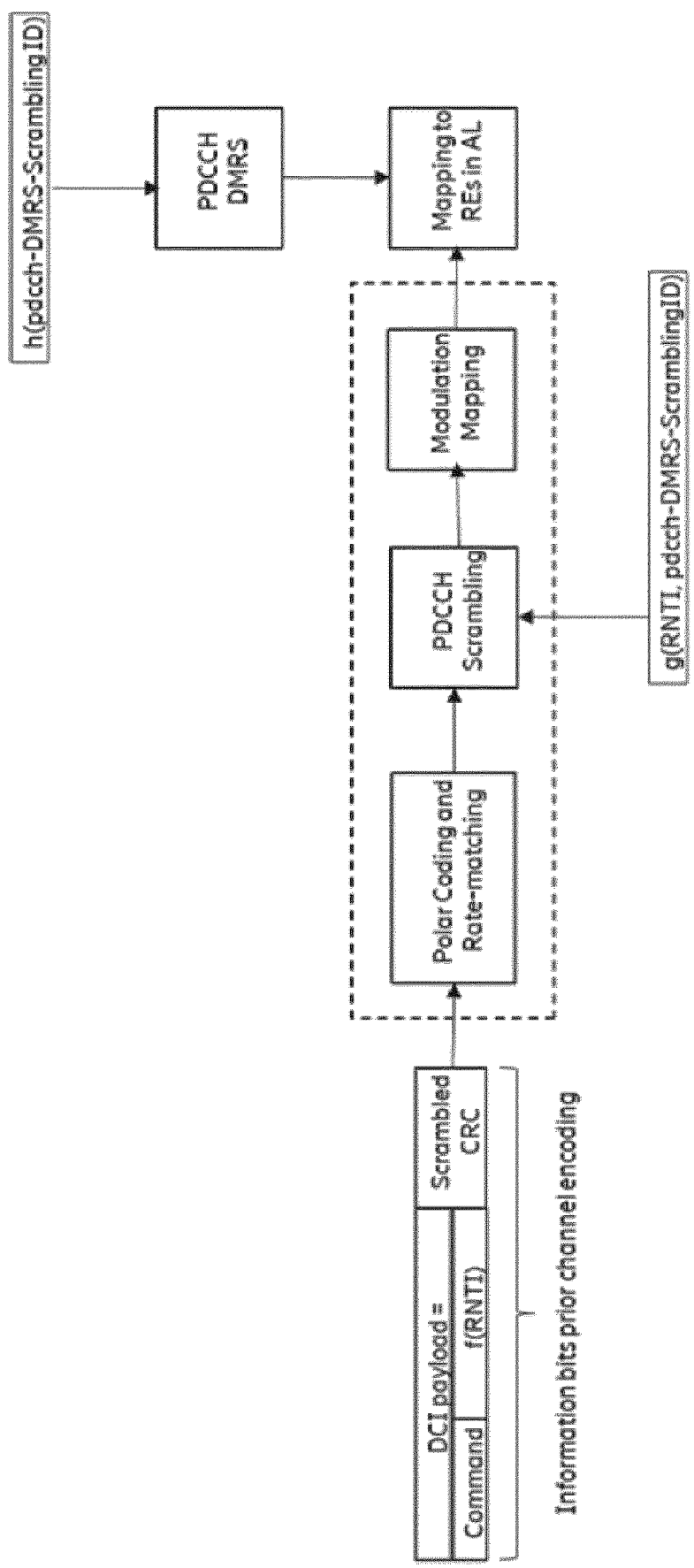
FIG. 7 shows an exemplary scenario in which the information bits shown in FIG. 5 undergo a PDCCH scrambling based on RNTI, among other operations.

In some embodiments, the information bits shown in FIGS. 4-6 can undergo subsequent coding, scrambling, and modulation operations, some of which can also be based on RNTI. FIG. 7 shows an exemplary scenario in which the information bits shown in FIG. 5 undergo a PDCCH scrambling based on RNTI, among other operations. The PDCCH scrambling can use, as a scrambling initialization seed, RNTI and/or a pdcch-DMRS-scrambling ID. Moreover, the DM-RS REs associated with the PDCCH undergo scrambling, which is also initialized by the pdcch-DMRS-scrambling ID. In some embodiments, scrambling of both coded bits and DM-RS can be based on using RNTI as the initialization seed when the WUS-DCI is transmitted in a UE-specific search space (USS). In some embodiments, scrambling of both coded bits and DM-RS can be based on using RNTI as the initialization seed when the WUS-DCI is transmitted in a common search space (CSS) or search space for a group of UEs. In either case, RNTI can be UE-specific or UE-group specific.

It is also possible that, in the arrangement shown in FIG. 7, there are no DM-RS REs present in the PDCCH, such that the REs that would have been used for PDCCH DM-RS would also contain the output from the PDCCH scrambling via the modulation mapping.

In other embodiments, the function of RNTI in the DCI payload, f(RNTI), may be optionally present, such that f(RNTI) can have zero size in some circumstances. In this case, the WUS-DCI payload can include command(s), any zero padding or filler bits, and an applied CRC. The CRC may be scrambled with RNTI, as customary, or the CRC scrambling can be omitted, with RNTI being applied in a subsequent scrambling step such as PDCCH and/or DM-RS scrambling illustrated in FIG. 7 and discussed above in relation to other exemplary embodiments. Alternately, the command can have zero size and f(RNTI) can have non-zero size.

Figure 8:
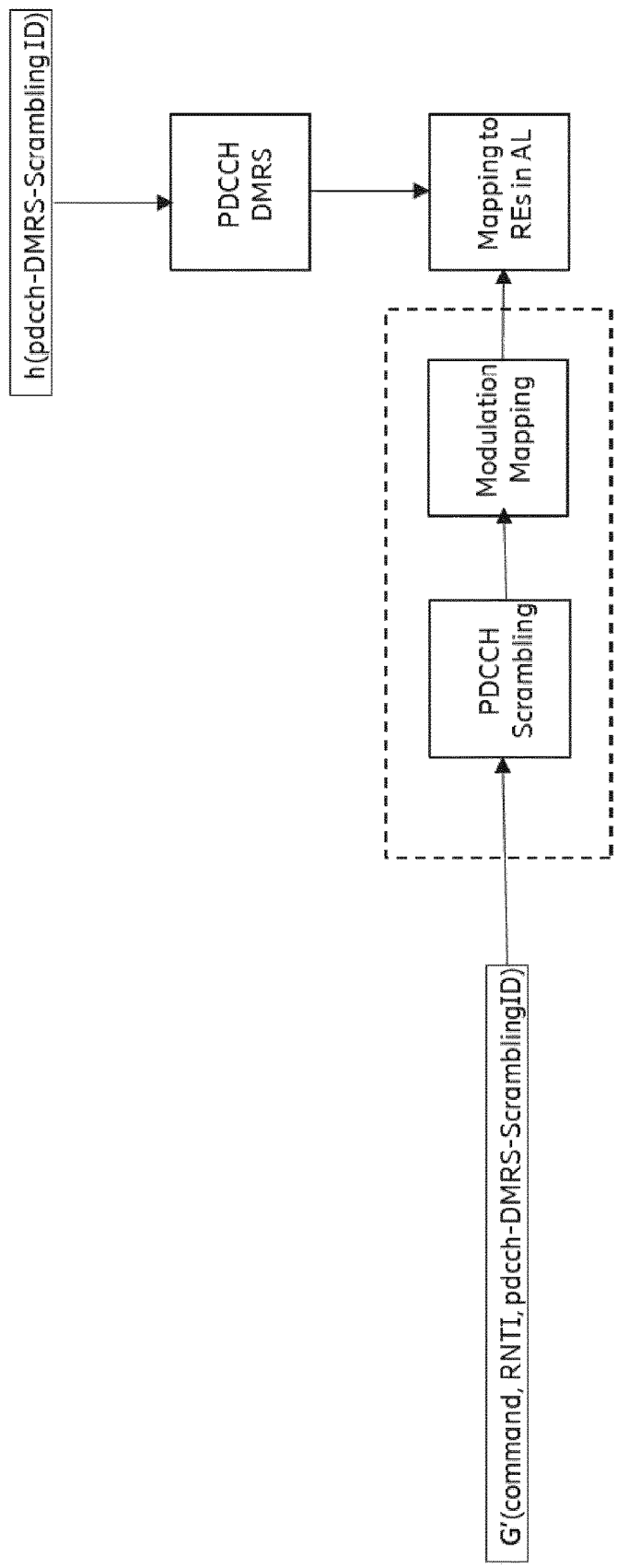
FIG. 8 shows an exemplary scenario where a scrambling sequence generator function utilizes initialization seeds that can include the command and/or the RNTI, according to various exemplary embodiments of the present disclosure.

In some embodiments, WUS-DCI processing can be simplified relative to conventional DCI processing by avoiding and/or omitting some latency-inducing operations. FIG. 8 illustrates a scenario where a scrambling sequence generator function, G', utilizes initialization seeds that can include the command and/or the RNTI. The generated scrambling sequence could be applied to any known sequence; in case the sequence to be scrambled is the all-zero sequence, the outcome of the scrambling (e.g., XOR) operation would be scrambling sequence itself. In some embodiments, the initialization seed can also include the pdcch-DMRS-Scrambling ID. The scrambling operation could be based on RNTI as the initialization seed when the command is transmitted in USS. In various embodiments, the scrambling sequence generator function, G', can be configured to use the command and/or RNTI as initialization seed(s) when the WUS-DCI is transmitted in USS, CSS, or a search space for a group of UEs. In all cases, RNTI can be UE-specific or UE-group specific. The DM-RS scrambling ID can also be UE-specific or cell-specific and can be different based on whether the command is transmitted in CSS, USS, or a search space for a group of UEs.

It is also possible that, in the arrangement shown in FIG. 8, there are no DM-RS REs present in the PDCCH, such that the REs that would have been used for PDCCH DM-RS would also contain the output from the PDCCH scrambling via the modulation mapping.

Figure 9:
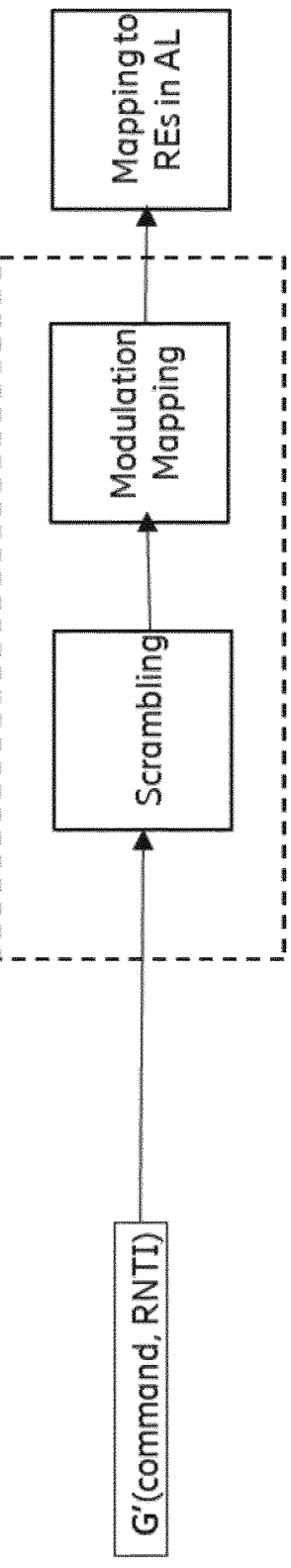
FIG. 9 illustrates a variation of the scenario shown in FIG. 8, in which the PDCCH transmission has no associated demodulation reference signals (DM-RS).

In some embodiments, WUS-DCI processing can be further simplified relative to conventional DCI processing by avoiding and/or omitting other latency-inducing operations. FIG. 9 illustrates a variant of FIG. 8 in which the PDCCH transmission has no associated DM-RS. This arrangement can simplify WU command reception by the target UE, although it can result in certain scheduling restrictions. For example, the WU command could be restricted from being transmitting in a CORESET configured for wideband RS transmission. Except for the omission of DM-RS and associated pdcch-DMRS-Scrambling ID, the embodiments illustrated by FIG. 9 can operate in a similar manner as the embodiments discussed above with respect to FIG. 8.

In conventional DCI formats (e.g., DCI 1-0), information fields can carry various parameters required for scheduling a PDSCH or PUSCH transmissions. Some examples of such fields include frequency location, scheduling time offset index, TB format, and redundancy version (RV). In some embodiments, some or all of these existing fields can be reused and/or repurposed for UE-specific content insertion. This allows the existing DCI format framework to be reused fully, without defining new variations to the formats.

For example, in a transmission to a given UE, the format fields can be assigned UE-specific values that are known to the UE prior to reception. One option is to assign specific predetermined UE-specific field values. Another option is to fill the fields with values that have a UE-independent initial value and are scrambled or otherwise modified using UE-specific parameters, e.g., C-RNTI or portion thereof. For example, different portions of the C-RNTI may be used for modifying different field contents.

These embodiments described above can be further illustrated with reference to FIGS. 10-11, which depict exemplary methods and/or procedures performed by a UE and a network node, respectively. In other words, various features of the operations described below correspond to various embodiments described above.

Figure 10:
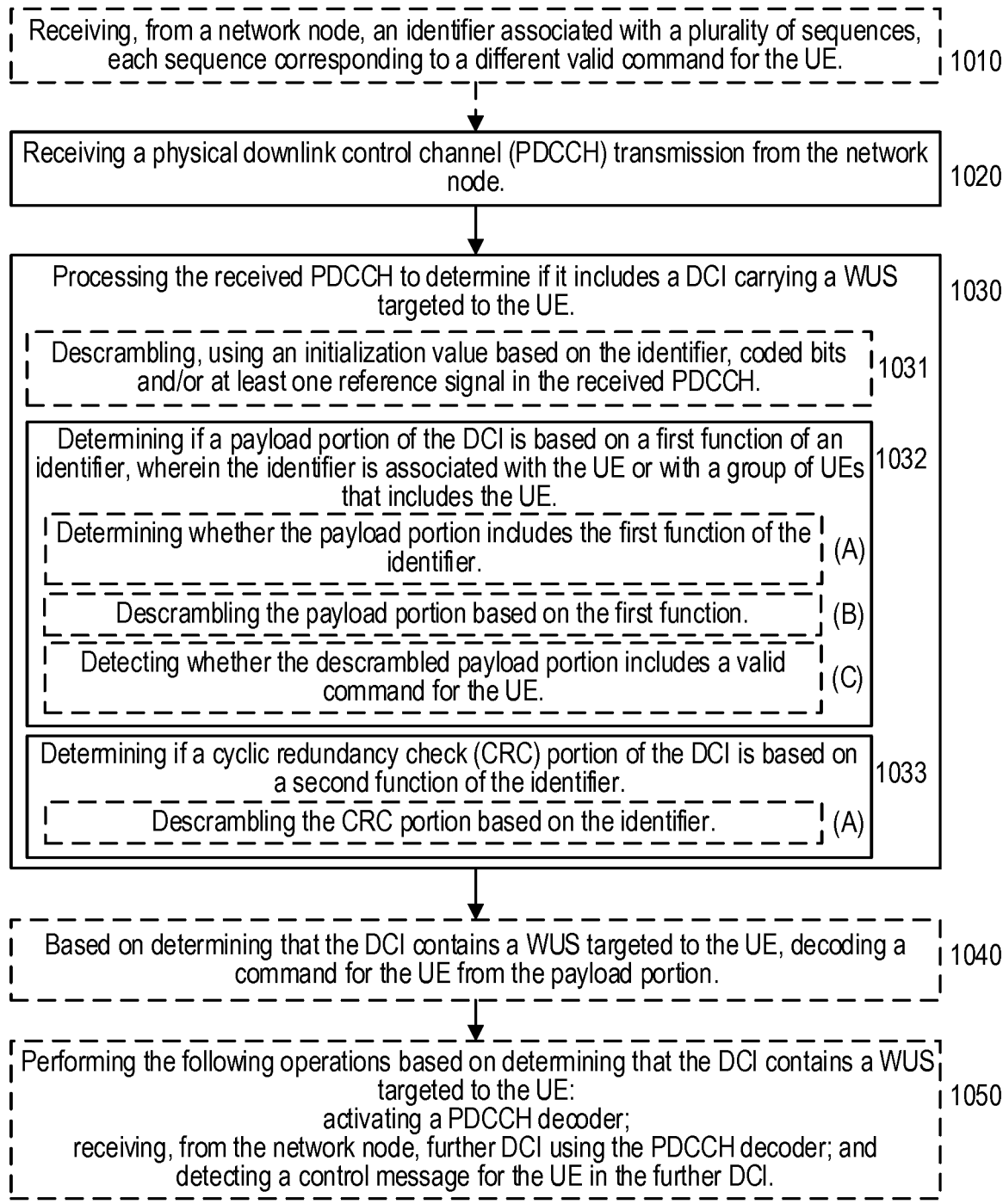
FIG. 10 shows a flow diagram of an exemplary method and/or procedure performed by a user equipment (UE, e.g., wireless device, MTC device, NB-IoT device, modem, etc.

In particular, FIG. 10 shows a flow diagram of an exemplary method and/or procedure for receiving a wake-up signal (WUS) via downlink control information (DCI) transmitted by a network node in a radio access network (RAN), according to various exemplary embodiments of the present disclosure. The exemplary method and/or procedure can be performed by a user equipment (UE, e.g., wireless device, IoT device, modem, etc. or component thereof), such as illustrated in other figures herein. Furthermore, the exemplary method and/or procedure shown in FIG. 10 can be used cooperatively with other exemplary methods and/or procedures described herein (e.g., FIG. 11) to provide various exemplary benefits described herein. Although FIG. 10 shows specific blocks in a particular order, the operations of the exemplary method and/or procedure can be performed in a different order than shown and can be combined and/or divided into blocks having different functionality than shown. Optional blocks or operations are indicated by dashed lines.

The exemplary method and/or procedure shown in FIG. 10 can include the operations of block 1020, where the UE can receive a physical downlink control channel (PDCCH) from the network node. The exemplary method and/or procedure can also include the operations of block 1030, where the UE can process the received PDCCH to determine if it includes a DCI carrying a WUS targeted to the UE. The operations of block 1030 can include the operations of sub-block 1032, where the UE can determine if a payload portion of the DCI is based on a first function of an identifier associated with the UE or with a group of UEs that includes the UE. The operations of block 1030 can include the operations of sub-block 1033, where the UE can determine if a cyclic redundancy check (CRC) portion of the DCI is based on a second function of the identifier.

In some embodiments, the exemplary method and/or procedure can also include the operations of blocks 1040 and/or 1050, which are based on determining that the payload portion of the DCI contains a WUS targeted to the UE (e.g., in block 1030). In block 1040, the UE can decode a command for the UE from the payload portion. In block 1050, the UE can perform the following operations: activating a PDCCH decoder; receiving, from the network node, further DCI using the PDCCH decoder; and decoding, from the further DCI, a schedule for a subsequent transmission to or from the UE on a shared channel (e.g., PDSCH or PDSCH).

In some embodiments, the identifier can be one of a cell radio network temporary identifier (C-RNTI) or a wake-up group RNTI (WUG-RNTI). In some embodiments, the first function can include truncation of the identifier to a smaller number of bits, or repetition of at least a portion of the identifier. In some embodiments, the second function can include scrambling the CRC based on the identifier. In such embodiments, the operations of sub-block 1033 can include descrambling (1033A) the CRC portion based on the identifier.

In various embodiments, determining if the payload portion is based on the first function of the identifier (i.e., in sub-block 1032) can include various operations. In some embodiments, the operations of sub-block 1032 can include determining (1032A) whether the payload portion includes the first function of the identifier (e.g., as illustrated in FIG. 4). In some embodiments, this operation (1032A) can include determining whether the payload portion comprises the first function of the identifier concatenated with a valid command for the UE (e.g., as illustrated in FIG. 5).

In other embodiments, the operations of sub-block 1032 can include descrambling (1032B) the payload portion based on the first function, and detecting (1032C) whether the descrambled payload portion includes a valid command for the UE. In some embodiments, the descrambling (1032B) can be performed using an exclusive OR (XOR), such as illustrated in FIGS. 6B-6C. In some embodiments, detecting (1032C) whether the descrambled payload portion includes a valid command comprises detecting whether the descrambled payload portion includes a valid command concatenated with one or more padding bits (e.g., as illustrated in FIG. 6B).

In other embodiments, detecting (1032C) whether the descrambled payload portion includes a valid command can include detecting whether the descrambled payload portion comprises one of a plurality of valid sequences, with each sequence corresponding to a different valid command (e.g., as illustrated in FIG. 6C). In some of these embodiments, the exemplary method and/or procedure can also include the operations of block 1010, where the UE can receive, from the network node, an identifier associated with the plurality of sequences. For example, the identifier can identify a valid subset of all available sequences, such that the UE attempts to detect only the valid sequences as identified.

In some embodiments, the operations of block 1030 can include the operations of sub-block 1031, where the UE can descramble at least one of the following using an initialization value based on the identifier: coded bits in the received PDCCH, and at least one reference signal in the received PDCCH. For example, the coded bits in the PDCCH can include the DCI carrying the WUS targeted for the UE (e.g., the information bits in any of FIGS. 4-6 after undergoing channel coding). Such descrambling can be performed, for example, if the PDCCH has been scrambled before transmission, illustrated in FIGS. 7-8.

In addition, FIG. 11 shows a flow diagram of an exemplary method and/or procedure for transmitting a wake-up signal (WUS) to at least one user equipment (UE) via downlink control information (DCI), according to various exemplary embodiments of the present disclosure. The exemplary method and/or procedure can be performed by a network node (e.g., base station, eNB, gNB, etc. or components thereof) in a radio access network (RAN, e.g., E-UTRAN, NG-RAN, etc.), such as illustrated in other figures herein. Furthermore, the exemplary method and/or procedure shown in FIG. 11 can be used cooperatively with other exemplary methods and/or procedures described herein (e.g., FIG. 10) to provide various exemplary benefits described herein. In addition, although FIG. 11 shows specific blocks in a particular order, the operations of the exemplary method and/or procedure can be performed in a different order than shown and can be combined and/or divided into blocks having different functionality than shown. Optional blocks or operations are indicated by dashed lines.

The exemplary method and/or procedure illustrated in FIG. 11 can include the operations of block 1120, where the network node can, based on an identifier associated with the UE or with a group of UEs that includes the UE, determine DCI that includes a WUS for the UE. The operations of block 1120 can include the operations of sub-block 1121, where the network node can determine a payload portion of the DCI based on a first function of the identifier. The operations of block 1120 can include the operations of sub-block 1122, where the network node can determine a cyclic redundancy check (CRC) portion of the DCI based on a second function of the identifier. The exemplary method and/or procedure can also include the operations of block 1130, where the network node can transmit the DCI via a PDCCH.

In some embodiments, the exemplary method and/or procedure can also include the operations of blocks 1130 and/or 1150. In block 1130, the network node can scramble at least one of the following using an initialization value based on the identifier: coded bits to be transmitted in the PDCCH; and at least one reference signal to be transmitted in the PDCCH. For example, the coded bits can include the DCI after undergoing channel coding. FIGS. 7-9 illustrate embodiments of such operations. In block 1150, the network node can transmit, to the UE via the PDCCH, further DCI including a schedule for a subsequent transmission to or from the UE on a shared channel (e.g., PDSCH or PUSCH). In some embodiments, the DCI is transmitted at a first time, the further DCI is transmitted at a second time (i.e., later than the first time), and the difference between the first time and the second time is greater than a PDCCH decoder activation time associated with the UE.

In some embodiments, the identifier can be one of a cell radio network temporary identifier (C-RNTI) or a wake-up group RNTI (WUG-RNTI). In some embodiments, the first function can include truncation of the identifier to a smaller number of bits, or repetition of at least a portion of the identifier. In some embodiments, the second function can include scrambling based on the identifier (e.g., via XOR). In such embodiments, the operations of sub-block 1122 can include scrambling (1122A) the CRC portion based on the identifier.

In various embodiments, determining the payload portion based on the first function of the identifier (i.e., sub-block 1121) can include various operations. In some embodiments, the operations of sub-block 1121 can include inserting (1121A) the first function of the identifier into the payload portion (e.g., as illustrated in FIG. 4).

In some embodiments, the operations of sub-block 1121 can include inserting (1121D) a command for the UE into the payload portion (e.g., as illustrated in FIGS. 5-6). In some embodiments, the operations of sub-block 1121 can include scrambling (1121C) the command by the first function before inserting the command into the payload portion (e.g., as illustrated in FIGS. 6B-6C). In some embodiments, the operations of sub-block 1121 can include concatenating (1121B) the command with one or more padding bits before the scrambling (e.g., as illustrated in FIG. 6B).

In some embodiments, the command can be represented by one of a plurality of valid sequences, with each sequence corresponding to a different valid command (e.g., as illustrated in FIG. 6C). In such embodiments, the exemplary method and/or procedure can include the operations of block 1110, where the network node can transmit, to the UE, an identifier associated with the plurality of valid sequences. For example, the identifier can identify a valid subset of all available sequences.

In some embodiments, the operations of sub-block 1121 can include concatenating (1121E) the command with the first function of the identifier, and inserting (1121F) the concatenated command and first function of the identifier into the payload portion. Exemplary DCIs according to such embodiments are illustrated in FIGS. 5 and 6B.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

FIG. 12 shows a high-level view of an exemplary 5G network architecture, including a Next Generation Radio Access Network (NG-RAN) 1299 and a 5G Core (5GC) 1298. As shown in the figure, NG-RAN 1299 can include gNBs 1210 (e.g., 1210a,b) and ng-eNBs 1220 (e.g., 1220a,b) that are interconnected with each other via respective Xn interfaces. The gNBs and ng-eNBs are also connected via the NG interfaces to 5GC 1298, more specifically to the AMF (Access and Mobility Management Function) 1230 (e.g., AMFs 1230a,b) via respective NG-C interfaces and to the UPF (User Plane Function) 1240 (e.g., UPFs 1240a,b) via respective NG-U interfaces.

Figure 1:
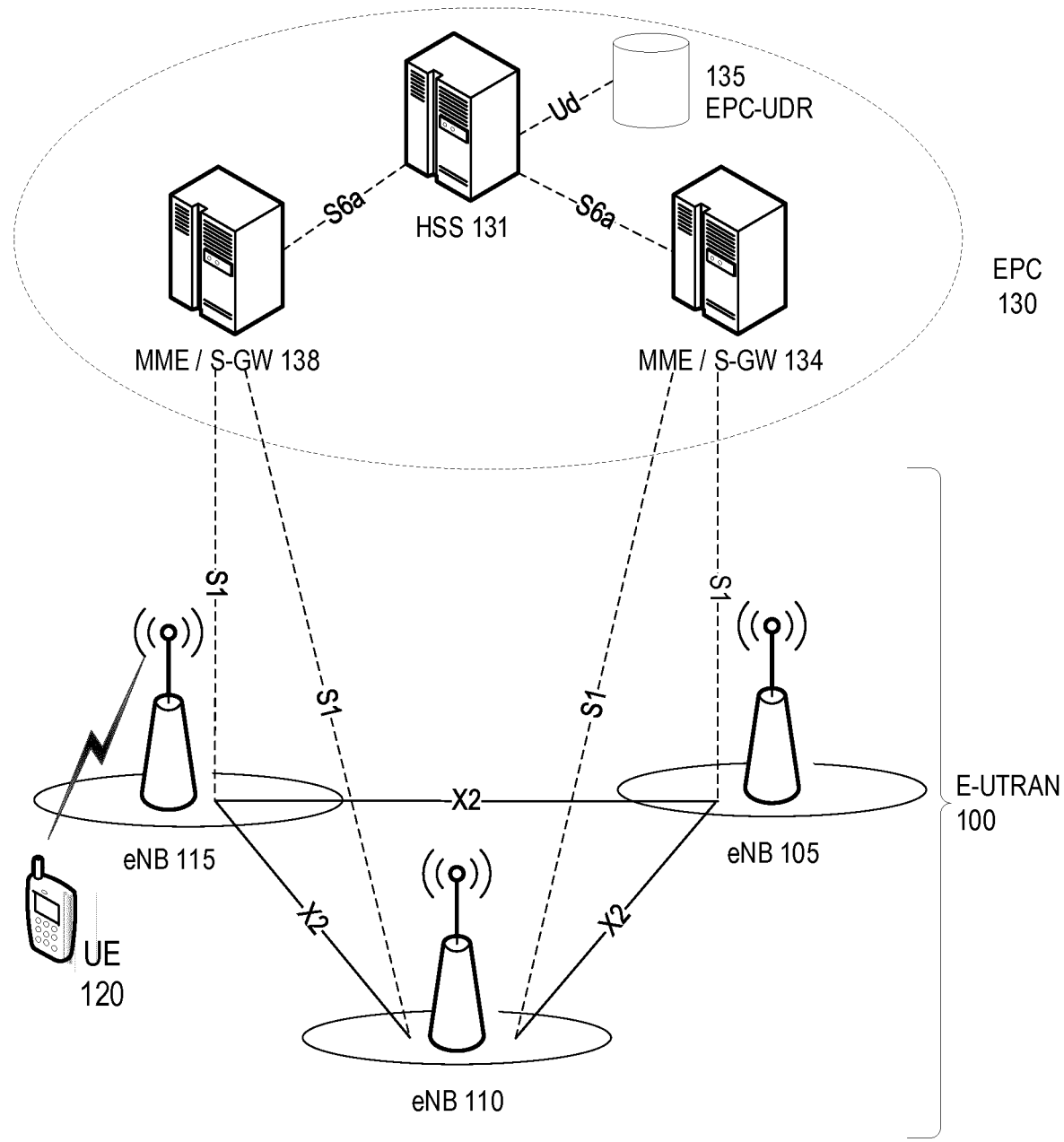
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
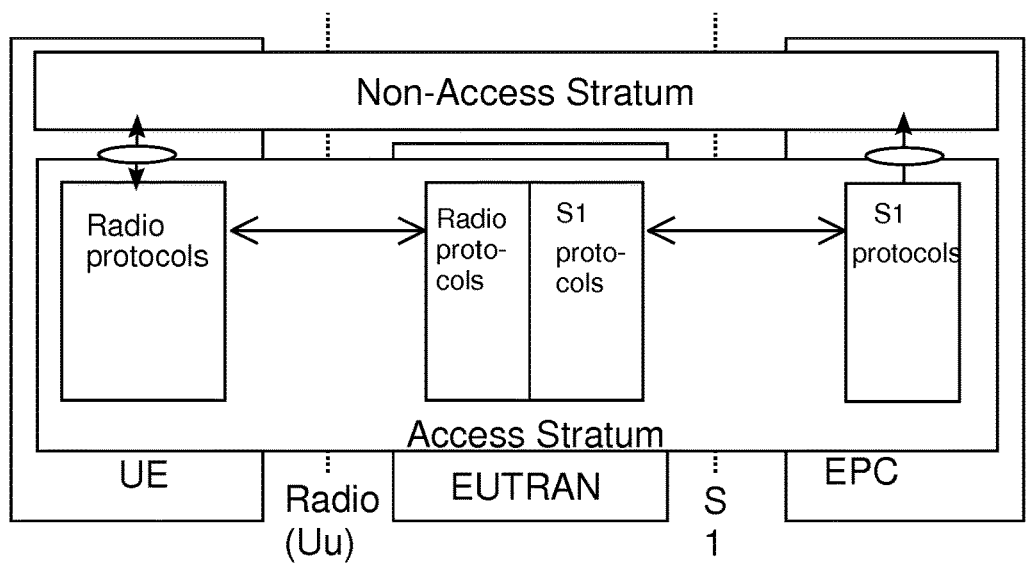
FIG. 2A is a high-level block diagram of an exemplary E-UTRAN architecture in terms of its constituent components, protocols, and interfaces.
Figure 2B:
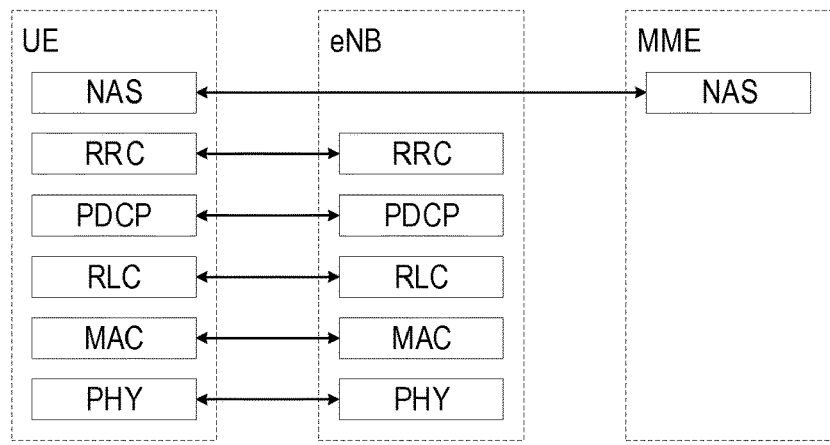
FIG. 2B is a block diagram of exemplary protocol layers of the control-plane portion of the radio (Uu) interface between a user equipment (UE) and the E-UTRAN.
Figure 2C:
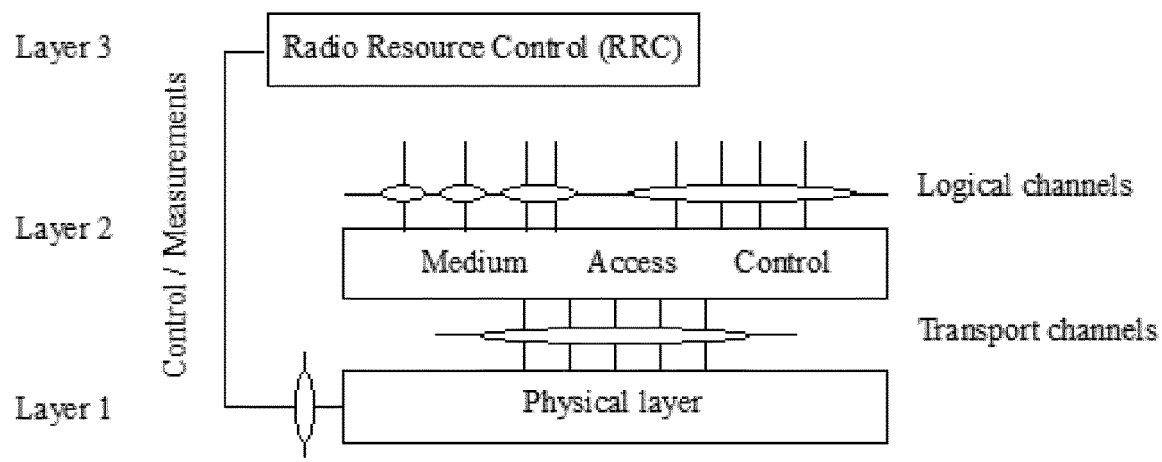
FIG. 2C is a block diagram of an exemplary LTE radio interface protocol architecture from the perspective of the PHY layer.
Figure 3:
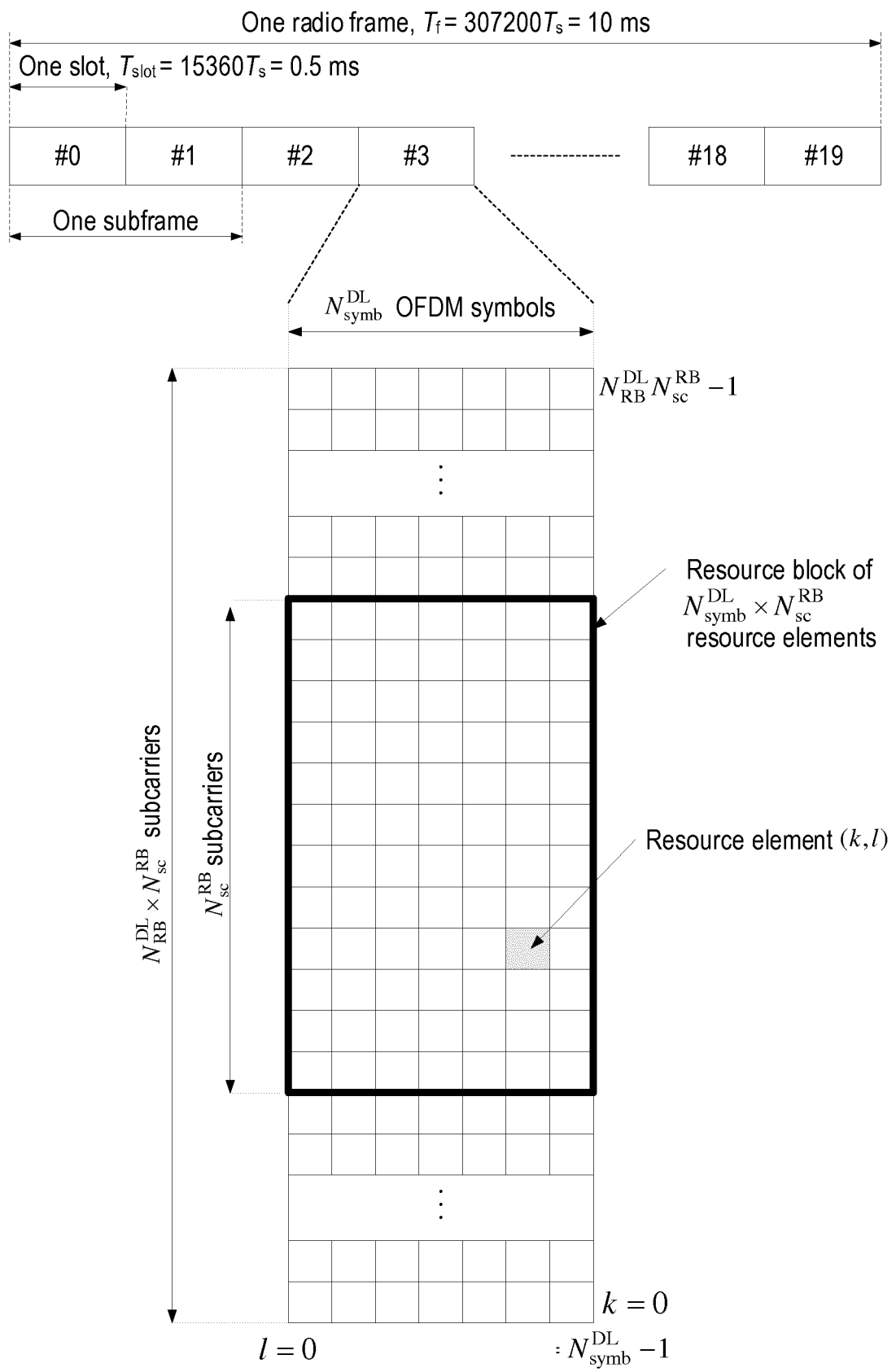
FIG. 3 illustrates an exemplary downlink radio frame structure used for LTE frequency division duplexing (FDD) operation.

Each of the gNBs 1210 can support the NR radio interface, including frequency division duplexing (FDD), time division duplexing (TDD), or a combination thereof. In contrast, each of ng-eNBs 1220 supports the LTE radio interface but, unlike conventional LTE eNBs (e.g., as illustrated by FIG. 1), connect to the 5GC via the NG interface. In various embodiments, the gNBs 1210 and the ng-eNBs 1220 can operate in licensed and/or unlicensed spectrum.

FIG. 13 shows a block diagram of an exemplary wireless device or user equipment (UE) configurable according to various exemplary embodiments of the present disclosure, including by execution of instructions on a computer-readable medium that correspond to, or comprise, any of the exemplary methods and/or procedures described above.

Exemplary device 1300 can comprise a processor 1310 that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) executed by processor 1310 that can configure and/or facilitate device 1300 to perform various operations, including operations described below. For example, execution of such instructions can configure and/or facilitate exemplary device 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with transceiver 1340, user interface 1350, and/or host interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1320 can also comprises software code executed by processor 1310 to control the functions of device 1300, including configuring and controlling various components such as transceiver 1340, user interface 1350, and/or host interface 1360. Program memory 1320 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from device 1300, from which the instructions can be downloaded into program memory 1320 located within or removably coupled to device 1300, so as to enable execution of such instructions.

Data memory 1330 can comprise memory area for processor 1310 to store variables used in protocols, configuration, control, and other functions of device 1300, including operations corresponding to, or comprising, any of the exemplary methods and/or procedures described herein. Moreover, program memory 1320 and/or data memory 1330 can comprise non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed. Persons of ordinary skill in the art will recognize that processor 1310 can comprise multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of device 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A transceiver 1340 can comprise radio-frequency transmitter and/or receiver circuitry that facilitates the device 1300 to communicate with other equipment supporting like wireless communication standards and/or protocols. In some exemplary embodiments, the transceiver 1340 includes a transmitter and a receiver that enable device 1300 to communicate with various 5G/NR networks according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some exemplary embodiments, the transceiver 1340 includes an LTE transmitter and receiver that can facilitate the device 1300 to communicate with various LTE, LTE-Advanced (LTE-A), and/or NR networks according to standards promulgated by 3GPP. In some exemplary embodiments of the present disclosure, the transceiver 1340 includes circuitry, firmware, etc. necessary for the device 1300 to communicate with various 5G/NR, LTE, LTE-A, UMTS, and/or GSM/EDGE networks, also according to 3GPP standards. In some exemplary embodiments of the present disclosure, transceiver 1340 includes circuitry, firmware, etc. necessary for the device 1300 to communicate with various CDMA2000 networks, according to 3GPP2 standards.

In some exemplary embodiments of the present disclosure, the transceiver 1340 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, transceiver 1340 can comprise a transceiver that is capable of wired communication, such as by using IEEE 802.3 Ethernet technology. The functionality particular to each of these embodiments can be coupled with or controlled by other circuitry in the device 1300, such as the processor 1310 executing program code stored in program memory 1320 in conjunction with, or supported by, data memory 1330.

User interface 1350 can take various forms depending on the particular embodiment of device 1300, or can be absent from device 1300 entirely. In some exemplary embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the device 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1300 having a touch screen display are capable of receiving user inputs, such as inputs related to exemplary methods and/or procedures described herein or otherwise known to persons of ordinary skill in the art.

In some exemplary embodiments of the present disclosure, device 1300 can comprise an orientation sensor, which can be used in various ways by features and functions of device 1300. For example, the device 1300 can use outputs of the orientation sensor to determine when a user has changed the physical orientation of the device 1300's touch screen display. An indication signal from the orientation sensor can be available to any application program executing on the device 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the device 1300 can take various forms depending on the particular exemplary embodiment of device 1300 and of the particular interface requirements of other devices that the device 1300 is intended to communicate with and/or control. For example, the control interface 1360 can comprise an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1300 can comprise more functionality than is shown in FIG. 13 including, for example, a video and/or still-image camera, microphone, media player and/or recorder, etc. Moreover, transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the device 1300, including various exemplary methods and/or computer-readable media according to various exemplary embodiments of the present disclosure.

FIG. 14 shows a block diagram of an exemplary network node 1400 configurable according to various embodiments of the present disclosure, including those described above with reference to other figures. In some exemplary embodiments, network node 1400 can comprise a base station, eNB, gNB, or component thereof. Network node 1400 comprises processor 1410 which is operably connected to program memory 1420 and data memory 1430 via bus 1470, which can comprise parallel address and data buses, serial ports, or other methods and/or structures known to those of ordinary skill in the art.

Program memory 1420 can store software code, programs, and/or instructions (collectively shown as computer program product 1421 in FIG. 14) executed by processor 1410 that can configure and/or facilitate network node 1400 to perform various operations, including operations described below. For example, execution of such stored instructions can configure network node 1400 to communicate with one or more other devices using protocols according to various embodiments of the present disclosure, including one or more exemplary methods and/or procedures discussed above. Furthermore, execution of such stored instructions can also configure and/or facilitate network node 1400 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1440 and core network interface 1450. By way of example and without limitation, core network interface 1450 can comprise the S1 interface and radio network interface 1450 can comprise the Uu interface, as standardized by 3GPP. Program memory 1420 can also include software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can comprise multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill in the art will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some exemplary embodiments, core network interface 1450 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

FIG. 15 is a block diagram of an exemplary communication network configured to provide over-the-top (OTT) data services between a host computer and a user equipment (UE), according to one or more exemplary embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above. RAN 1530 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface, such as illustrated in FIG. 1. As another example, gNBs comprising a NR RAN 1530 can communicate with a 5GC core network 1530 via an NG interface, such as illustrated in FIGS. 11-12.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1530 to transmit wake-up signals to UEs—such as UE 1510—in a manner that reduces the UE power consumption for monitoring a PDCCH for further control messages. When used in NR and/or LTE UEs (e.g., UE 1510) and eNBs and/or gNBs (e.g., comprising RAN 1530), exemplary embodiments described herein can reduce UE power consumption for PDCCH monitoring, thereby facilitating such UEs to use their stored energy capacity (e.g., in a battery) for other operations, such as receiving and/or transmitting data via OTT services. Such improvements can result in increased use of such OTT services with less need to recharge UE batteries.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated embodiments:

1. A method for receiving, by a user equipment (UE), a wake-up signal (WUS) carried in downlink control information (DCI) transmitted by a network node in a radio access network (RAN), the method comprising:
   receiving, from the network node, a first identifier is associated with the UE or a group of UEs comprising the UE;
   receiving, from the network node, downlink control information (DCI) associated with a physical downlink control channel (PDCCH) transmission; and
   processing the received DCI to determine if it contains a WUS targeted to the UE, wherein the processing comprises:
   determining if a payload portion of the DCI is based on a first function of the identifier; and
   determining if a cyclic redundancy check (CRC) portion of the DCI is based on a second function of the identifier.

2. The method of embodiment 1, wherein if it is determined that the DCI contains a WUS targeted to the UE, the method further comprises decoding, from the payload portion, a command for the UE.

3. The method of any of embodiments 1-2, wherein if it is determined that the DCI contains a WUS targeted to the UE, the method further comprises:
   activating a PDCCH decoder;
   receiving, from the network node, further DCI using the PDCCH decoder; and
   detecting a control message for the UE in the further DCI.

4. The method of any of embodiments 1-3, wherein:
   the second function comprises scrambling; and
   determining if the CRC portion of the DCI is based on the second function comprises descrambling the CRC portion based on the first identifier.

5. The method of any of embodiments 1-4, wherein:
   the first function comprises repetition of at least a portion of the identifier; and
   determining if the payload portion of the DCI is based on the first function comprises detecting multiple repetitions of the at least a portion of the identifier in the payload portion.

6. The method of any of embodiments 1-4, wherein determining if the payload portion of the DCI is based on the first function of the identifier comprises detecting if the payload portion comprises a command concatenated with the first function.

7. The method of any of embodiments 1-4, wherein determining if the payload portion of the DCI is based on the first function of the identifier comprises:
   descrambling the payload portion based on the first function; and
   detecting whether the descrambled payload portion comprises a valid command.

8. The method of any of embodiments 1-4, wherein determining if the payload portion of the DCI is based on the first function of the identifier comprises:
   descrambling the payload portion based on the first function; and
   detecting whether the descrambled payload portion comprises one of a plurality sequences, each sequence corresponding to a different valid command for the UE.

9. The method of embodiment 8, further comprising receiving, from the network node, an identifier associated with the plurality of sequences.

10. The method of any of embodiments 6-9, wherein the first function comprises multiple repetitions of at least a portion of the first identifier.

11. The method of any of embodiments 1-10, further comprising, prior to processing the received DCI, descrambling the PDCCH transmission using an initialization value based on the first identifier.

12. The method of any of embodiments 1-11, wherein the first identifier is one of a cell radio network temporary identifier (C-RNTI) or a wake-up group RNTI (WUG-RNTI).

13. A method for transmitting, by a network node in a radio access network (RAN), a wake-up signal (WUS) to one or more user equipment (UE) via downlink control information (DCI), the method comprising:
   transmitting, to a UE, a first identifier associated with the UE or a group of UEs comprising the UE; and
   transmitting, to the UE via a physical downlink control channel (PDCCH), downlink control information (DCI) comprising a WUS targeted to the UE, wherein:
      a payload portion of the DCI is based on a first function of the identifier; and
      a cyclic redundancy check (CRC) portion of the DCI is based on a second function of the identifier.

14. The method of embodiment 13, wherein the payload portion further comprises a command for the UE.

15. The method of any of embodiments 13-14, further comprising subsequently transmitting, to the UE via the PDCCH, a further DCI comprising information scheduling a subsequent transmission, on a shared channel, to or from the UE.

16. The method of embodiment 15, wherein transmission time difference between the DCI and the further DCI is greater than a PDCCH decoder activation time associated with the UE.

17. The method of any of embodiments 13-16, wherein the second function comprises scrambling the CRC portion based on the first identifier.

18. The method of any of embodiments 13-17, wherein the first function comprises inserting multiple repetitions of at least a portion of the identifier in the payload portion.

19. The method of any of embodiments 13-18, wherein the payload portion of the DCI comprises a command concatenated with the first function of the first identifier.

20. The method of any of embodiments 13-18, wherein the payload portion of the DCI comprises a command, for the UE, scrambled by the first function.

21. The method of embodiment 20, wherein the payload portion comprises one of a plurality of sequences, each sequence corresponding to a different command for the UE.

22. The method of any of embodiments 13-21, further comprising transmitting, to the UE, an identifier associated with the plurality of sequences.

23. The method of any of embodiments 13-22, further comprising scrambling a PDCCH transmission, comprising the DCI, using an initialization value based on the first identifier.

24. The method of any of embodiments 13-23, wherein the first identifier is one of a cell radio network temporary identifier (C-RNTI) or a wake-up group RNTI (WUG-RNTI).

25. A user equipment (UE) configured to receive a wake-up signal (WUS) carried in downlink control information (DCI) transmitted by a network node in a radio access network (RAN), the UE comprising:
   communication circuitry configured to communicate with a network node; and
   processing circuitry operatively associated with the communication circuitry and configured to perform operations corresponding to the methods of any of exemplary embodiments 1-12.

26. A network node, in a radio access network (RAN), configured to transmit wake-up signals (WUS) to one or more user equipment (UE) via downlink control information (DCI), the network node comprising:
   communication circuitry configured to communicate with the one or more UEs; and
   processing circuitry operatively associated with the communication circuitry and configured to perform operations corresponding to the methods of any of exemplary embodiments 13-24.

27. A non-transitory, computer-readable medium storing computer-executable instructions that, when executed by at least one processor of a user equipment (UE), configure the UE to perform operations corresponding to the methods of any of exemplary embodiments 1-12.

28. A non-transitory, computer-readable medium storing computer-executable instructions that, when executed by at least one processor of a network node, configure the network node to perform operations corresponding to the methods of any of exemplary embodiments 13-24.

The invention claimed is:

1. A method for receiving, by a user equipment (UE), a wake-up signal (WUS) carried in downlink control information (DCI) in a radio access network (RAN), the method comprising:
    receiving a physical downlink control channel (PDCCH) from a network node in the RAN; and
    processing the received PDCCH to determine whether the received PDCCH includes a DCI carrying a WUS targeted to the UE, wherein the processing comprises:
        determining whether a payload portion of the DCI is based on a first function of an identifier associated with the UE or with a group of UEs that includes the UE, according to one of the following:
            determining whether the payload portion includes the first function of the identifier concatenated with a valid command for the UE, or
            descrambling the payload portion based on the first function and detecting whether the descrambled payload portion includes a valid command for the UE; and
        determining whether a cyclic redundancy check (CRC) portion of the DCI is based on a second function of the identifier, wherein the second function is different than the first function.

2. The method of claim 1, wherein the first function includes one of the following:
    truncation of the identifier to a smaller number of bits, or repetition of at least a portion of the identifier.

3. The method of claim 1, wherein detecting whether the descrambled payload portion includes a valid command comprises detecting whether the descrambled payload portion includes a valid command concatenated with one or more padding bits.

4. The method of claim 1, wherein detecting whether the descrambled payload portion includes a valid command comprises detecting whether the descrambled payload portion comprises one of a plurality of valid sequences, each sequence corresponding to a different valid command.

5. The method of claim 1, further comprising, based on determining that the DCI contains a WUS targeted to the UE, decoding the valid command for the UE from the payload portion.

6. The method of claim 1, further comprising performing the following operations based on determining that the DCI contains a WUS targeted to the UE:
    activating a PDCCH decoder;
    receiving, from the network node, further DCI using the PDCCH decoder; and
    decoding, from the further DCI, a schedule for a subsequent transmission to or from the UE on a shared channel.

7. The method of claim 1, wherein the second function includes the CRC being scrambled based on the identifier.

8. The method of claim 1, wherein processing the received PDCCH further comprises descrambling at least one of the following using an initialization value based on the identifier:
    coded bits in the received PDCCH, and
    at least one reference signal in the received PDCCH.

9. A non-transitory, computer-readable medium storing computer-executable instructions that, when executed by processing circuitry of a user equipment (UE), configure the UE to perform operations corresponding to the method of claim 1.

10. A method for transmitting, by a network node in a radio access network (RAN), a wake-up signal (WUS) to at least one user equipment (UE) via downlink control information (DCI), the method comprising:
    determining a DCI that includes a WUS for the UE, comprising:
        determining a payload portion of the DCI based on a first function of an identifier associated with the UE or with a group of UEs that includes the UE, according to one of the following:
            inserting into the payload portion a concatenation of the first function of the identifier and a valid command for the UE, or
            scrambling a valid command for the UE by the first function and inserting the scrambled valid command into the payload portion; and
        determining a cyclic redundancy check (CRC) portion of the DCI based on a second function of the identifier, wherein the second function is different than the first function; and
    transmitting the DCI via a physical downlink control channel (PDCCH).

11. The method of claim 10, wherein the first function includes one of the following:
    truncation of the identifier to a smaller number of bits, or repetition of at least a portion of the identifier.

12. A network node, of a radio access network (RAN), configured to transmit wake-up signals (WUS) to one or more user equipment (UEs) via downlink control information (DCI), the network node comprising:
    radio network interface circuitry configured to communicate with the one or more UEs; and
    processing circuitry operatively coupled to the radio network interface circuitry, whereby the processing circuitry and the radio network interface circuitry are configured to perform operations corresponding to the method of claim 11.

13. The method of claim 10, wherein the valid command is represented by one of a plurality of valid sequences, each sequence corresponding to a different valid command.

14. The method of claim 10, wherein determining the payload portion further comprises concatenating the valid command with one or more padding bits before the scrambling.

15. The method of claim 10, further comprising subsequently transmitting, to the UE via the PDCCH, a further DCI including a schedule for a subsequent transmission to or from the UE on a shared channel, wherein:
    the DCI is transmitted at a first time;
    the further DCI is transmitted at a second time; and
    the difference between the first time and the second time is greater than a PDCCH decoder activation time associated with the UE.

16. The method of claim 10, wherein determining a CRC portion of the DCI based on the second function comprises scrambling the CRC portion based on the identifier.

17. The method of claim 10, further comprising scrambling at least one of the following using an initialization value based on the identifier:
    coded bits to be transmitted in the PDCCH; and
    at least one reference signal to be transmitted in the PDCCH.

18. A non-transitory, computer-readable medium storing computer-executable instructions that, when executed by processing circuitry of a network node, configure the network node to perform operations corresponding to the method of claim 10.

19. A user equipment (UE) configured to receive a wake-up signal (WUS) via downlink control information (DCI) in a radio access network (RAN), the UE comprising:

transceiver circuitry configured to communicate with a network node in the RAN; and processing circuitry operatively coupled to the transceiver circuitry, whereby the processing circuitry and the transceiver circuitry are configured to:

receive a physical downlink control channel (PDCCH) from a network node in the RAN; and process the received PDCCH to determine whether the received PDCCH includes a DCI carrying a WUS targeted to the UE, wherein the processing comprises:

determining whether a payload portion of the DCI is based on a first function of an identifier associated with the UE or with a group of UEs that includes the UE, according to one of the following:

determining whether the payload portion includes the first function of the identifier concatenated with a valid command for the UE, or descrambling the payload portion based on the first function and detecting whether the descrambled payload portion includes a valid command for the UE; and determining whether a cyclic redundancy check (CRC) portion of the DCI is based on a second function of the identifier, wherein the second function is different than the first function.

* * * * *